Figure 6:
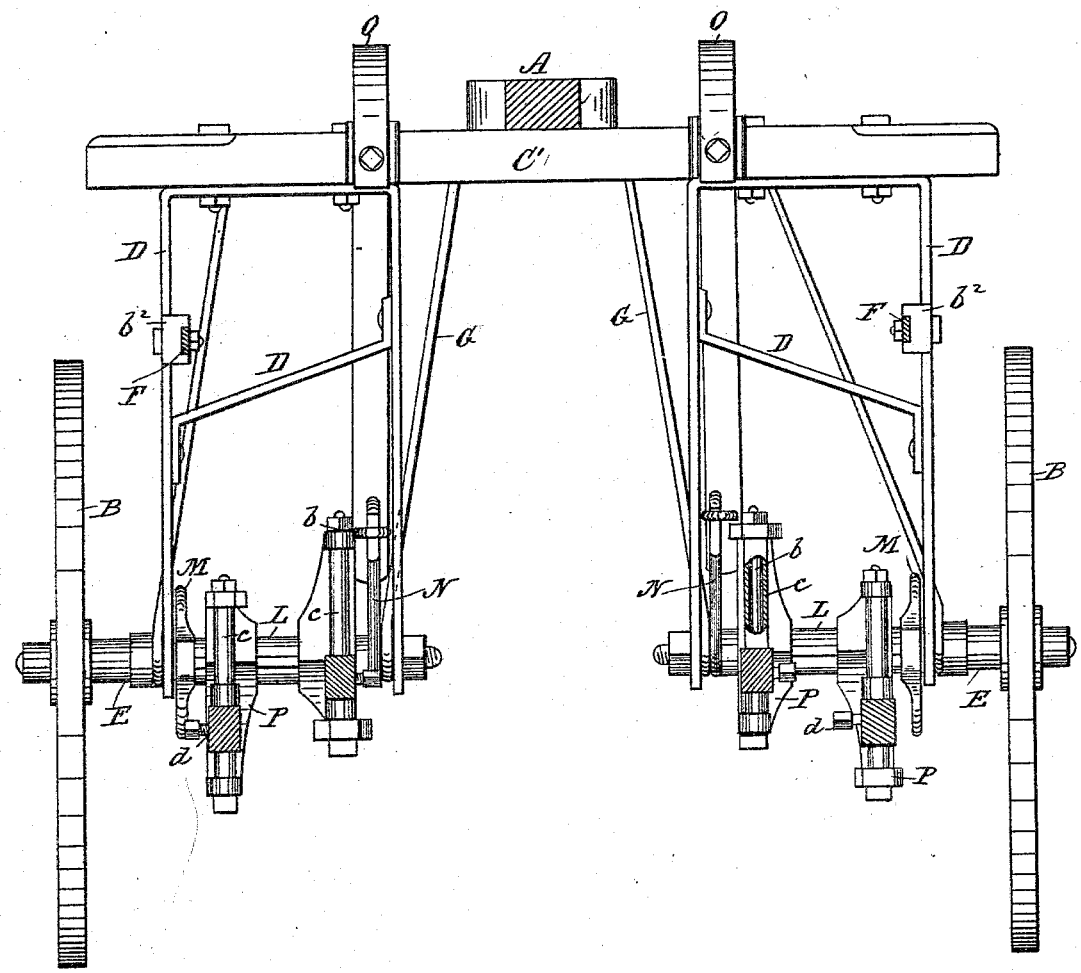

(No Model.) W. P. BROWN. 4 Sheets—Sheet 1.
WHEEL CULTIVATOR.
No. 288,003. Patented Nov. 6, 1883.
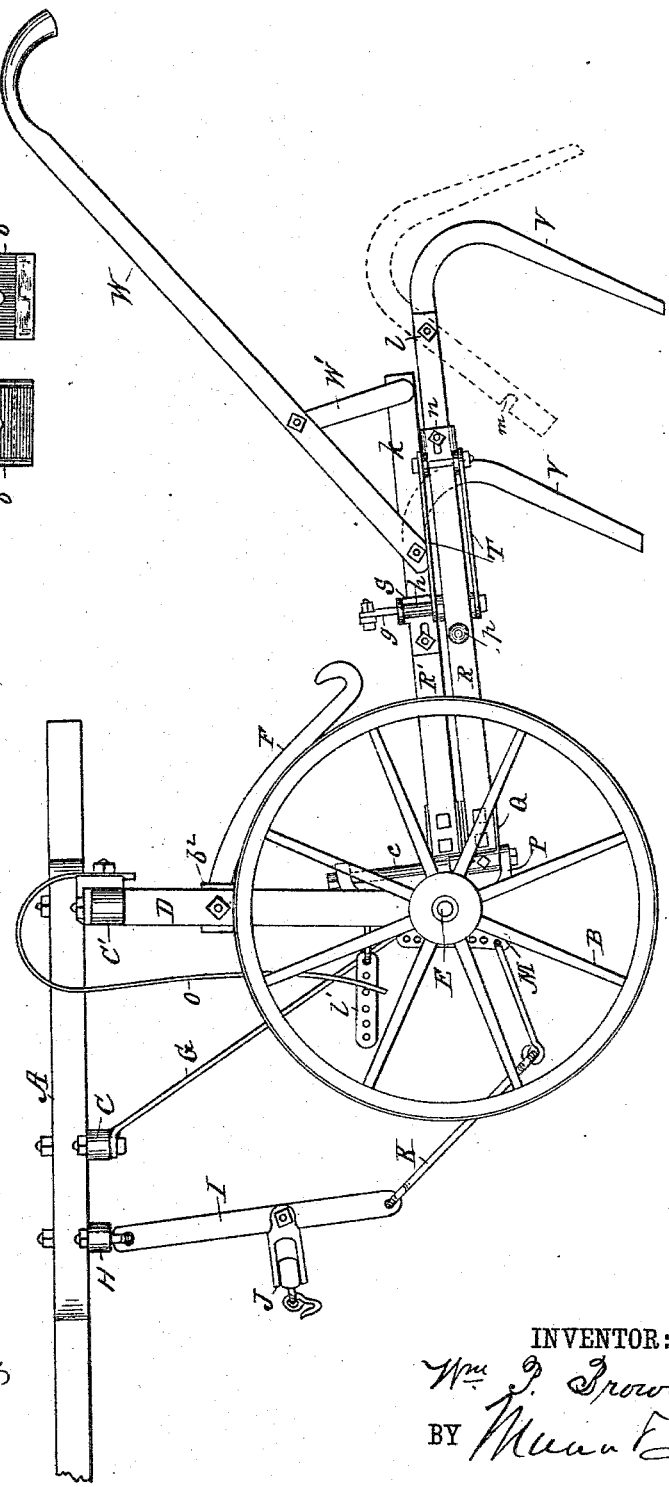
WITNESSES:
W. W. Hollingsworth
Edw. W. Byrn
INVENTOR:
Wm. P. Brown
BY Munn & Co.
ATTORNEYS.

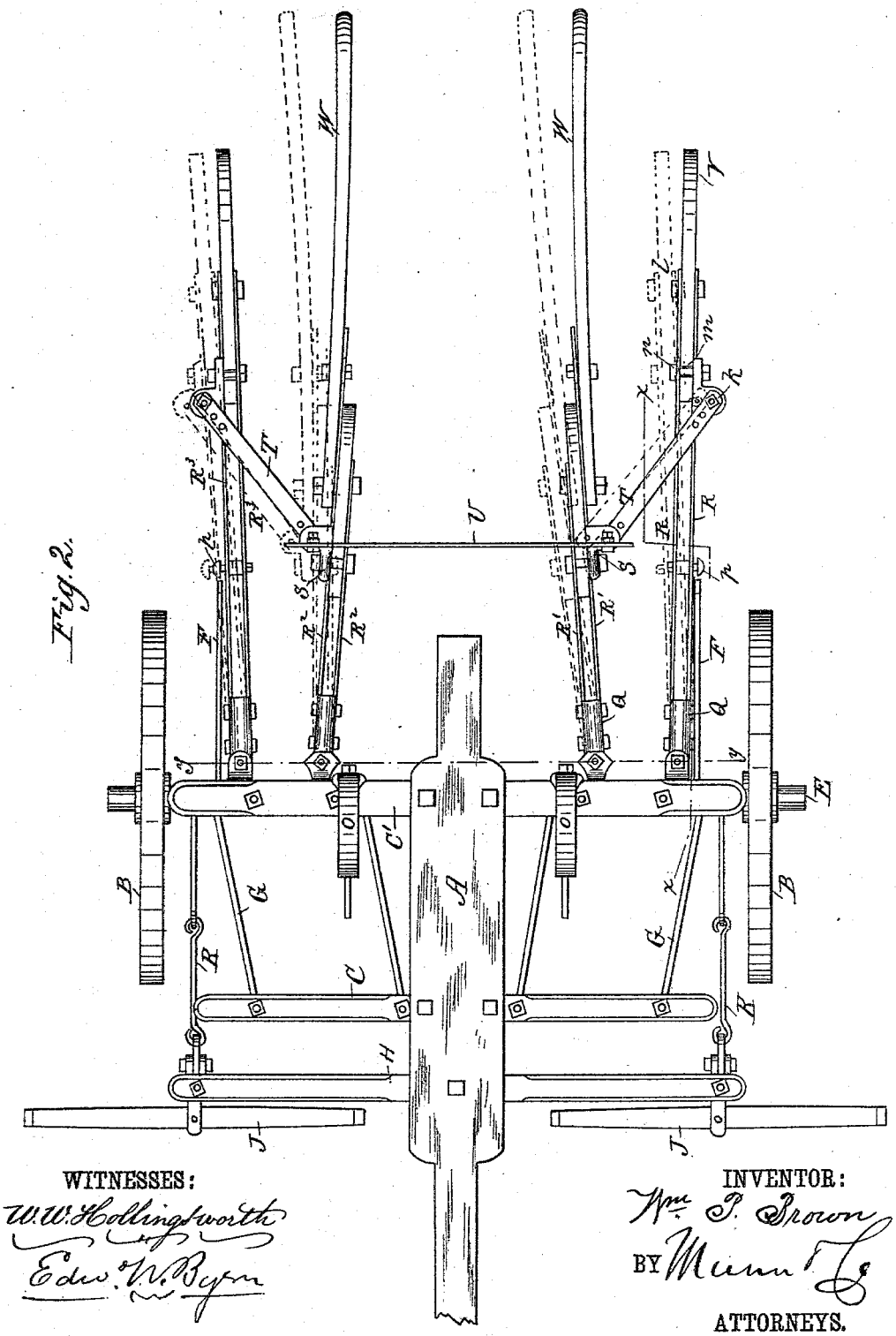

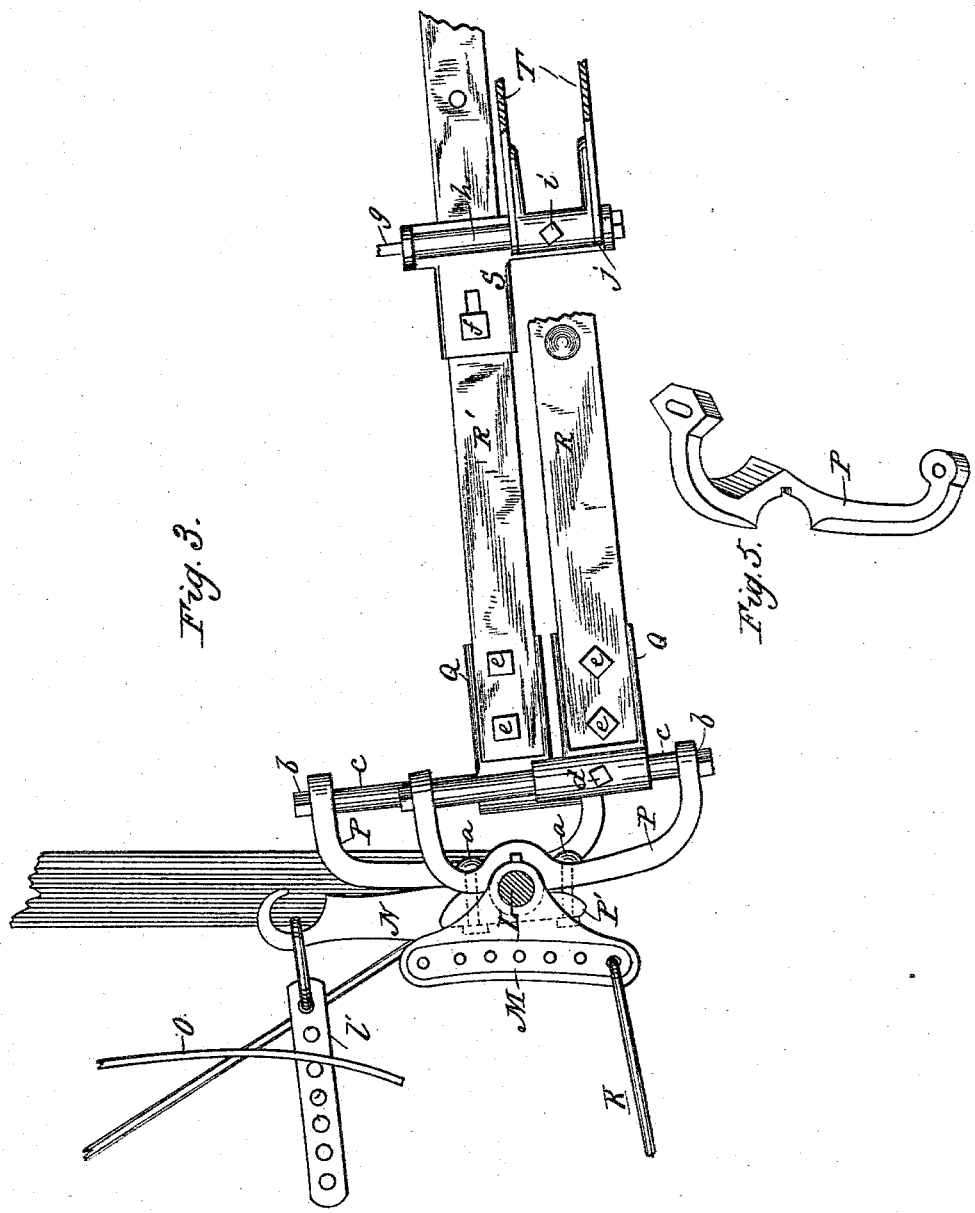

(No Model.)　　　　　W. P. BROWN.　　　4 Sheets—Sheet 4.
WHEEL CULTIVATOR.

No. 288,003.　　　　　Patented Nov. 6, 1883.

WITNESSES:
W. W. Hollingsworth
Edw. W. Byrn

INVENTOR:
Wm. P. Brown
BY Munn & Co.
ATTORNEYS.

UNITED STATES PATENT OFFICE.

WILLIAM P. BROWN, OF ZANESVILLE, OHIO.

WHEEL-CULTIVATOR.

SPECIFICATION forming part of Letters Patent No. 288,003, dated November 6, 1883.

Application filed June 13, 1883. (No model.)

*To all whom it may concern:*

Be it known that I, WILLIAM P. BROWN, of Zanesville, in the county of Muskingum and State of Ohio, have invented a new and useful Improvement in Wheeled Cultivators; and I do hereby declare that the following is a full, clear, and exact description of the same, reference being had to the accompanying drawings, forming part of this specification, in which—

Figure 1 is a side elevation. Fig. 2 is a plan view. Fig. 3 is an enlarged detail view in section through line $xx$ of Fig. 2. Fig. 4 shows details of the opposite sides of coupling-plate $b^2$. Fig. 5 is a detail of bracket P, and Fig. 6 is a vertical cross-section through the line $yy$ of Fig. 2.

My invention relates to wheeled cultivators of that class in which the two wheels run upon opposite sides of the row of plants and sustain above the same a truck or frame-work having a draft attachment for the team in front and plows behind, which are attached to and drawn by the truck, which may or may not have a tongue.

My improvements consist, principally, in the construction, arrangement, and adjustment of the plow-beams and their couplings, whereby the plows next to the row of plants may be set in a higher horizontal plane, to adapt them to the elevation of the row or ridge upon which the plants are, and whereby the plows may be adapted to a minimum width of truck and still preserve the proper lateral movement of the inner plows without throwing the outer ones against the wheels, and whereby, also, the lateral movement of the inner plows is made to have the least effect upon the outer plows consistent with their connection thereto, all as more fully described hereinafter.

In the drawings I have shown my invention in connection with a complete wheeled cultivator, which is provided with a tongue, but may be made without one, and whose parts I will first generally describe before proceeding to a more particular description of my improvements.

A represents the tongue of the cultivator, which is mounted above the wheels B B, and is rigidly connected at its rear end to two cross-bars, C C'. The rear one of these two cross-bars, C', has attached to it, on opposite sides of its middle, two downwardly-projecting metal frames, D D, Fig. 6, which, at their lower ends, are attached to and supported by the axles E E of the running-wheels B B.

To the side of each metal frame D is attached a hook, F, upon which the plows are hung by means of a button or projection, $p$, when they are not in action and the machine is to be transported. The hook F is attached to frame D by coupling-block $b^2$, Figs. 4 and 6, grooved on one side to receive the frame D and grooved at right angles on the other side to receive the hook. This coupling-block is secured to the hook and frame by a single bolt passing through them all. The front bar, C, forms a point of attachment for the inclined braces G G, that connect with the bottom of the metal frames D D and impart the necessary stiffness thereto.

H is the double-tree, having a swiveled connection to the tongue, and I are vertical bars at the ends of double-trees, which extend downwardly and carry the single-trees J, and the lower ends of which bars are connected by link-bars K with the draft-couplings M on the axle of the wheels, and through which the draft strain is principally imparted. On the axles of the wheels are arranged sleeves or pipe-boxes L, which at their outer ends carry the draft-flanges M, and at their inner ends have upwardly-projecting arms N, against which latter there bears, through link $l'$, the lower ends of the springs O, connected to the cross-beams C' above, and the effect of which springs is to rock the pipe-boxes and assist in lifting the plows when they are to be hung up out of action, the plow-couplings at the front being rigidly connected to the pipe-boxes.

P is a bracket, which, by means of a plate, P', Fig. 3, and bolts $a\,d$, is tightly clamped to the pipe-box L, or which may be fastened by any other suitable means. This bracket has the ends of its two arms perforated, and a bolt, $b$, Fig. 6, runs through the same and is surrounded by a tube, $c$. Around this tube is arranged the cylindrical end of the front plow-coupling, Q, which cylindrical end is fixed to the tube $c$, at different heights, by a set-screw,

*d*; or, instead of a set-screw, a collar may be applied above and below to effect the same result, or a fillet of a series of washers removed above or below to change its location. The plow-coupling Q is recessed on each side, to receive the forward end of the two bars R R, constituting the plow-beam, and which bars are fastened to said couplings by bolts *e e*, Fig. 3. By means of the tube *c* turning on bolt *b* it will be seen that the plow-beam is free to swing laterally or in a horizontal plane, while this long tube and the set-screw *d* permit the plow-coupling Q to be set higher or lower to raise or lower the plow-beam. One of the arms of the bracket P is also slotted at its end, (see Fig. 5,) so that the bolt *b* may be adjusted laterally to throw said bolt into a more or less vertical position, as may be desired.

There are four pairs of plow-beams, R R, R' R', R² R², and R³ R³, and each pair is at its front end connected to a bracket like that just described, and having the same adjustment. The plow-beams may, however, be made of one bar only, instead of two.

S S are other brackets, bolted at *f*, Fig. 3, to the inner pairs of plow-beams, and having a long vertical bolt, *g*, passing through it, which bolt is surrounded by a tube, *h*, to which is clamped, by a set-screw, *i*, a clevis-shaped coupling, *j*, having a cylindrical end that surrounds said tube, and which clevis-coupling is fastened to the diagonal cross-bar T. This furnishes means for adjusting the diagonal cross-bars up or down in a manner similar to the bracket at the front end, and as these diagonal cross-bars connect the inner plow-beams to the outer plow-beams, it will be seen that it permits the rear ends of the outer plow-beams to be raised or lowered without adjusting the standards of these plows, thus allowing the outer plows to work on lower ground and between the rows, while the inner plows run upon the hill or ridge of the row of plants.

The cross-coupling bars T are connected to the outer plow-beams by a clevis-coupling, *k*, Figs. 1 and 2, at a point in rear of the connection of the said bars to the inner plow-beam, so that these bars occupy a diagonal position to the line of draft. This secures several advantages, as follows: first, it allows the brackets at the front ends of the plows to be placed closer together or farther apart without changing the parallel position of the beams; and, secondly, it allows the inner beams to be moved sidewise by the plowman to dodge the stalks of corn without imparting the same degree of lateral throw to the outer beams, thus permitting the wheels of the cultivator to be set closer together, to reduce the width of the truck or frame, without involving the risk of striking the outer beams against the wheels. This same arrangement also is easier on the plowman, as it takes less labor to shift the inner plows laterally than if the outer plows had to be moved to the same extent.

U is a cross-bar, of wood or metal, which extends across and couples the inner plow-beams and connects to the flattened and perforated tops of the bolts *g*. This cross-bar may or may not be used, as circumstances may require.

The brackets S and clevis-couplings *j* have their plate portions slotted, and are connected to the beams by bolts passing through said slots, so that the said brackets and clevis-couplings may be slipped or adjusted forward and backward on the beams, to throw the cross-coupling bar T more or less obliquely to separate the plow-beams or bring them closer together as the inner beams are thrown from side to side.

V is the plow-standard or shovel-stock, which is pivoted between the rear ends of the plow-beams R R by a bolt, *l*, and whose forward and horizontal ends are provided with a slot, *m*, Fig. 1, opening at the top, and through which a bolt, *n*, passes. This bolt holds the forward end of the plow-standard by squeezing or clamping the bars R R against it, but if too great a strain comes against the shovel—such as is caused by a stump or stone—the slot permits the front end of the stock to move down, while the rear end rises, causing the standard to turn on its rear bolt, *l*, as a pivot, as shown in dotted lines, Fig. 1.

Instead of the slot *m*, the bolt may be placed close in front of the plow-standard V, and made to clamp sufficiently tight.

A prominent feature of advantage in this invention is that it not only furnishes plows for cultivators that may have their beams independently adjusted higher or lower, and arranged to fold or open sidewise, but it permits two of the plow-beams to be removed altogether and only two used. When the long beams alone are used, the handles W and braces W' are removed and applied to the long beams.

In making use of my invention I may employ the lateral swinging adjustment of the plow-beams without the vertical adjustment to different levels, or I may employ this adjustment of the two beams in different levels without the laterally-swinging adjustment.

The brackets P P and S S may be reversed, so as to turn the long ends up or down, (both positions of brackets P being shown in Figs. 3 and 6,) and if turned up the wood cross-coupling U will be carried higher above the growing plants. It also allows the outer beam to work higher than the inner one, if desired.

With respect to that feature of my invention which secures a different lateral throw for the two coupled beams, I would state that I am aware that beams have been coupled together by a right-angular connection, which secures always a parallel position for the two beams, as shown by the patent to Guthrie, No. 194,146. The inner beam, carrying the handle in this case, does have a different throw from the outer beam; but a different principle is involved from mine, for in Guthrie's devices when the plow-handle is thrown away from the plants from its normal line of draft the inner beam is thrown most, but when the inner plow-beam is thrown toward the row of plants the outer beam moves most. Now, in the use of plows of this character the beams are thrown as often toward the plants as they are from them, and my object is to make the adjustment of the inner beam as nearly independent as possible of the outer one, and by my oblique cross-bar it will be seen that when the inner beam is thrown away from the plants the inner beam is moved most, and when the inner beam is thrown towards the plants the inner beam is also moved most, which establishes a different result from that obtained by Guthrie, and enables me always to secure the minimum amount of interference with the outer beam for movement in both directions, the coupled beams occupying a position closer to each other when moved outward, and a position farther from each other when moved inward to the plants.

Having thus described my invention, what I claim as new is—

1. Plow-beams combined with and attached to a wheeled cultivator, and adapted to operate in pairs, which approach when moved outwardly from the plants and separate or move apart when moved inwardly to the plants, as and for the purpose described.

2. Plow-beams combined with a wheeled cultivator and attached to the same and to each other, substantially as described, whereby the inner beams are adapted to have a lateral throw greater than the outer ones, as set forth.

3. Plow-beams combined with a wheeled cultivator by a swiveled or hinged connection in front, and hinged or coupled together in the rear of this by a connection which causes the beams to approach when moved away from the plants and to separate when moved toward the plants, as described.

4. A wheeled cultivator having on each side of the row of plants two or more beams, one of which is set to work in a higher plane at its draft-connection than the other, the said beams being coupled by oblique connections for a variable lateral throw, as described.

5. The combination, with the axle of a wheeled cultivator and two or more plow-beams disposed to run upon each side of the row of plants, of two or more brackets attached to the axle on each side of the space for the row of plants, and connections for fastening the plow-beams independently at different vertical heights to said axle on the same side of the row of plants, as set forth.

6. The bracket P, having a perforation in one arm and a slot in the other, in combination with the bolt $b$, inclosing tube $c$, and plow-beam coupling Q', substantially as shown and described.

7. The combination, with two plow-beams hung about vertical centers at their draft ends, of a cross-coupling bar jointed to both beams, and having one end closer to the center of oscillation of the beam to which it is attached than the other end is to the center of oscillation of the other beam, as and for the purpose described.

8. The bracket S, having a bolt, $g$, surrounded by a tube, $h$, in combination with the inner plow-beam and the diagonal cross-bar T, having clevis-coupling $j$, as and for the purpose described.

9. The combination, with the two plow-beams, of the diagonal cross-bar T and coupling at the end thereof, having a longitudinal adjustment on the plow-beams, as shown and described.

WILLIAM P. BROWN.

Witnesses:
F. HAGER,
DANIEL B. GARY.